United States Patent

[11] 3,593,118

[72] Inventors Nathan H. Chaney
Fountain Valley;
Jerry L. Dillion, Morro Del Mar, both of, Calif.
[21] Appl. No. 763,597
[22] Filed Sept. 30, 1968
[45] Patented July 13, 1971
[73] Assignee Montedoro Corporation
San Luis Obispo, Calif.

[54] APPARATUS FOR MEASURING THE ELECTRICAL CONDUCTIVITY OF LIQUIDS HAVING DIELECTRIC-FACED ELECTRODES
4 Claims, 6 Drawing Figs.

[52] U.S. Cl. ............................................. 324/30 R,
324/61 R, 324/65 R
[51] Int. Cl. ................................................ G01n 27/42
[50] Field of Search .......................................... 324/65, 65
TC, 30 B, 61

[56] References Cited
UNITED STATES PATENTS

| | | | |
|---|---|---|---|
| 2,551,479 | 5/1951 | Wallace | 324/30 X |
| 3,188,561 | 6/1965 | Ingram | 324/30 |
| 3,339,138 | 8/1967 | Baker et al. | 324/64 |
| 3,447,070 | 5/1969 | Sand et al. | 324/65 X |
| 3,147,431 | 9/1964 | Bennett et al. | 324/30 X |

*Primary Examiner* — Edward E. Kubasiewicz
*Attorney* — Mellin, Morre and Weissenberger

ABSTRACT: A conductivity meter for measuring the conductivity of liquids can be made to give a reliable, direct conductivity reading on a linear scale by impressing an AC signal across a sample of the liquid between a pair of dielectric-faced, liquid-proofed electrodes, which together with the liquid form a lossy capacitor, and then proceed to measure the loss by an AC ohmmeter or servoed bridge circuit. A linear conductance scale on the ohmmeter is obtained by making the loss the major impedance in the circuit.

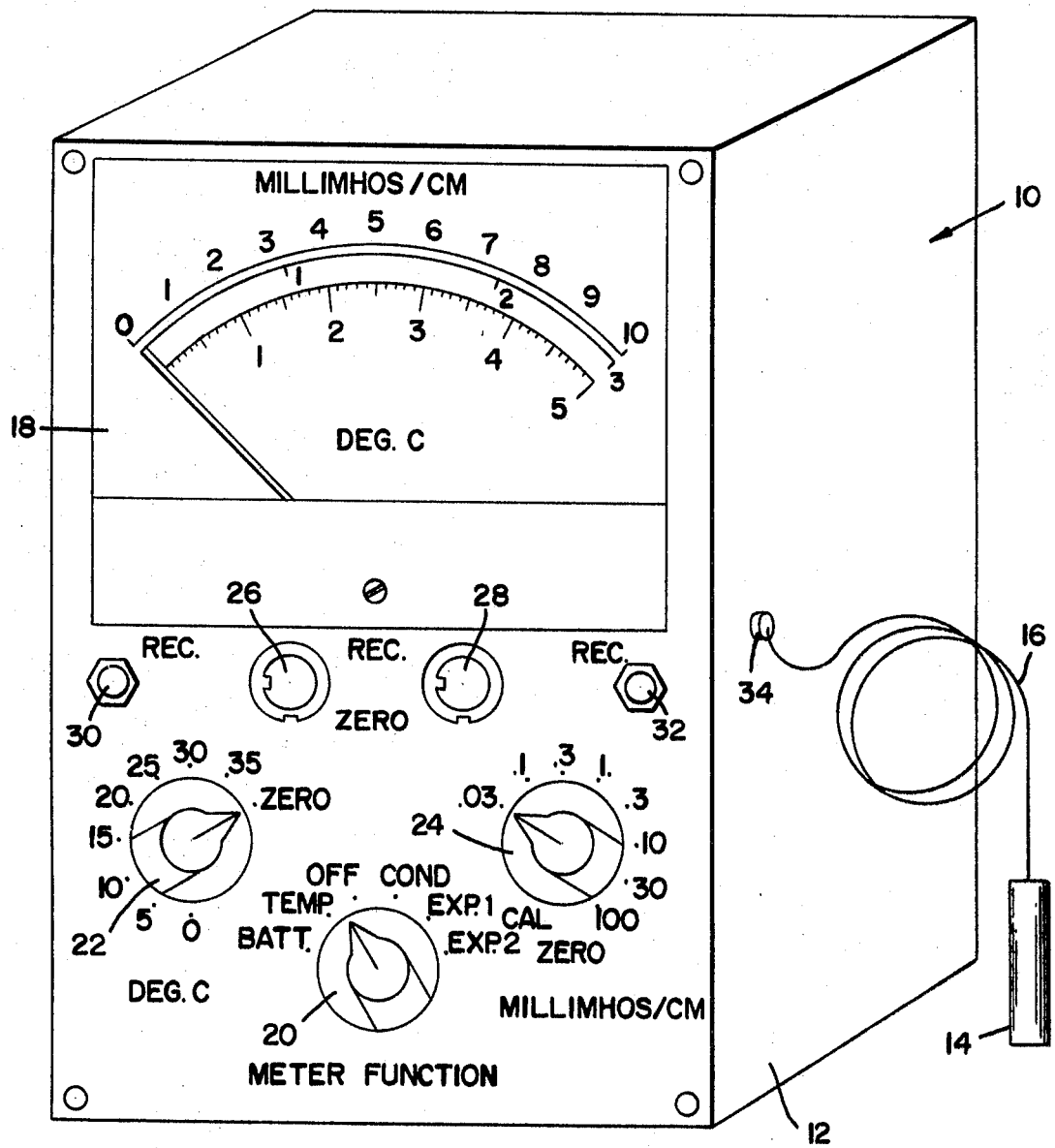
FIG_1

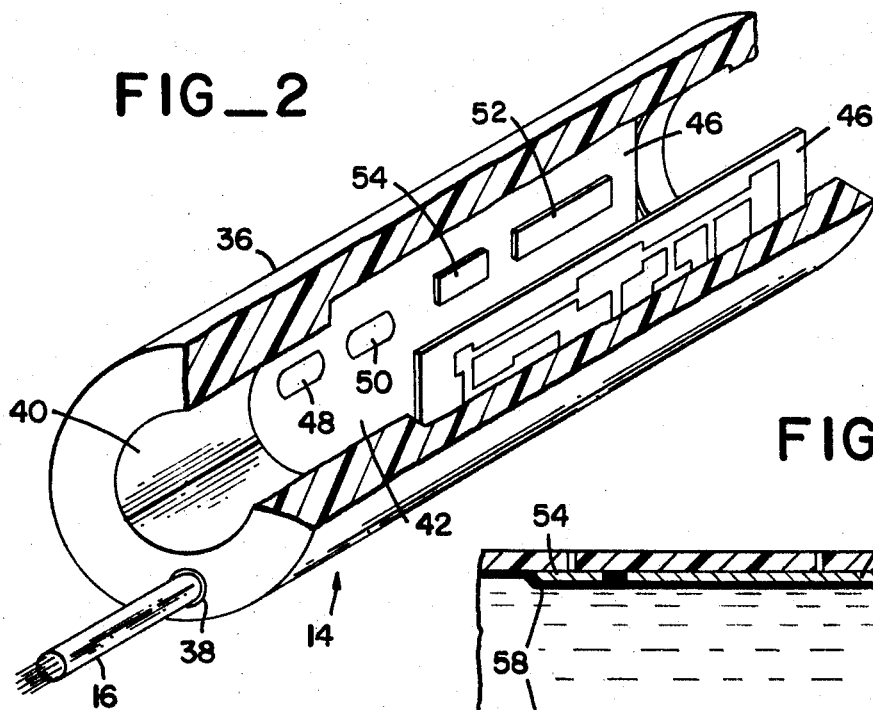
FIG_2
FIG_3
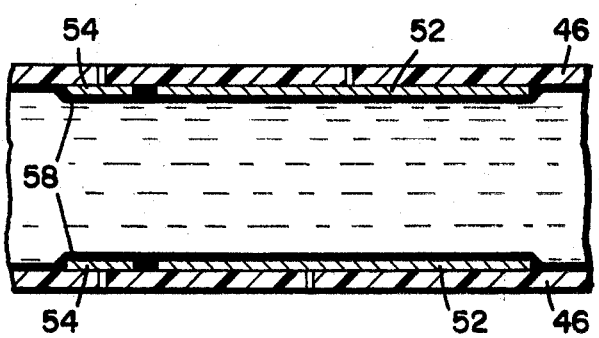
FIG_6
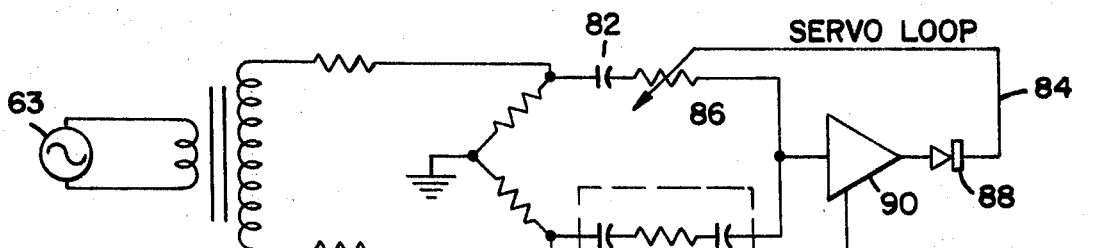
EQUIVALENT CIRCUIT OF WATER PATH
DC DRIVE SIGNAL OUTPUT TO INPUT OF DC AMPLIFIER 76
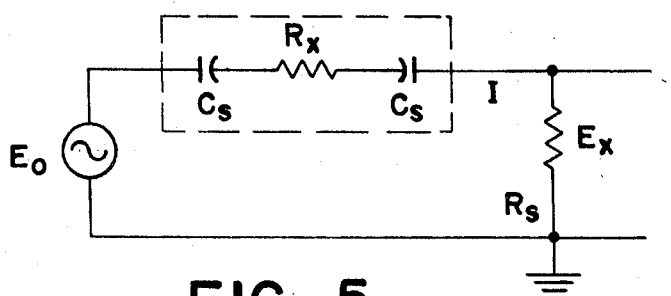
FIG_5
INVENTORS
NATHAN H. CHANEY
JERRY L. DILLION

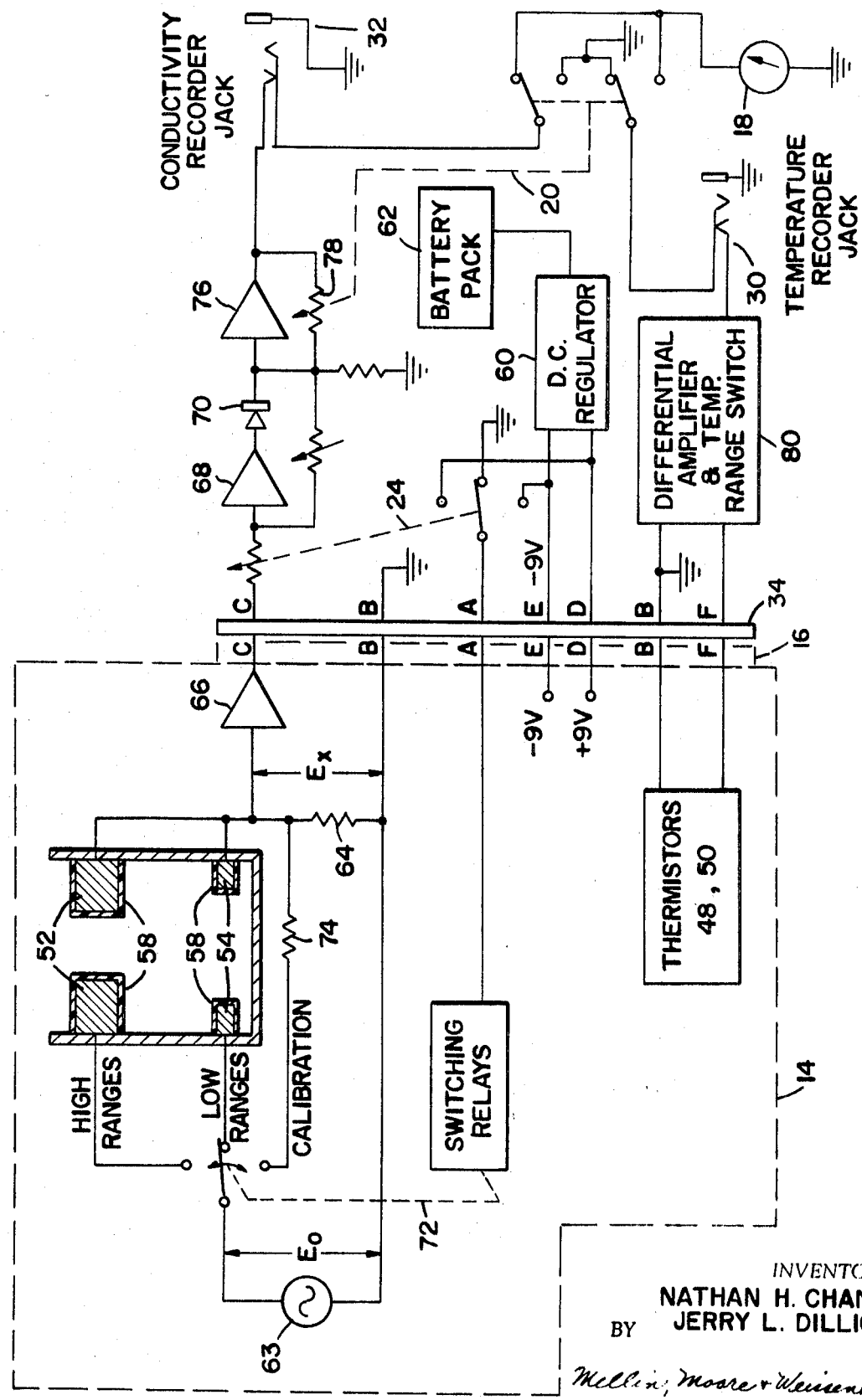
FIG_4

3,593,118

1

APPARATUS FOR MEASURING THE ELECTRICAL CONDUCTIVITY OF LIQUIDS HAVING DIELECTRIC-FACED ELECTRODES

BACKGROUND OF THE INVENTION

This invention relates to conductivity meters and more particularly, conductivity meters for obtaining a linear output directly proportional to the conductivity of a liquid over a wide range.

Conductivity meters are in wide use among limnologists and oceanographers, as well as in well surveying, to determine the salinity of a liquid or for locating thermoclines. From the parameters thus obtained, data such as water contamination or mineral content can be readily calculated.

Previous instruments for this purpose have generally been of two types: the direct contact ohmmeter type and the inductance loop type. The direct contact ohmmeter type uses a pair of noble metal electrodes in direct contact with the liquid and measures the resistance of the liquid. Although such a device is very simple, its electrodes readily corrode and cause errors; and like all ohmmeters, this type of meter has a nonlinear scale with its resulting variable accuracy. Using AC with direct contact between electrodes and liquid will still cause corrosion errors. Of course, a bridge can be used with the direct-contact type of instrument for more precise measurements, but this expedient requires constant manual adjustment and does not therefore lend itself to continuous recording. In addition, the corrosion errors remain. Finally, the resistance readings have to be inverted to obtain conductivity readings.

The inductance loop type of instrument eliminates the problem of corrosion because in this type of meter, an AC signal is passed between two inductance loops which are coupled by induction to the liquid to be measured. The disadvantage of this type of instrument is that it is bulky and that once again the output scale is nonlinear if direct readout is used. If a null measurement is performed, manual adjustment must be used, or else a complex servo circuit must be employed. Hence, this instrument also is unsuitable for continuous monitoring, especially in restricted areas such as water wells. Calibration of this type instrument is dependent on a large volume of surrounding water.

SUMMARY OF THE INVENTION

The present invention discloses a capacity-coupled conductivity meter which provides a DC output signal directly and linearly representative of the conductivity of the liquid. This output signal is then amplified to provide a DC current which can be used to drive conventional metering equipment. Inasmuch as the capacity coupling through the liquid takes place between two relatively narrow, spaced electrodes, it is possible to construct an instrument of this size with a probe of sufficiently small size to fit into small well casings or otherwise inaccessible places. The conductivity meter provides a continuous reading which follows conductivity fluctuations without requiring any manual bridge balancing. Consequently, the instrument is suitable for direct connection to a recorder which can make a continuous recording of conductivity variations as a function of time or as a function of water depth.

Inasmuch as conductivity, at a constant ionization level, is a function of temperature, means have been provided in the conductivity probe to continuously measure the temperature of the liquid flowing through the probe. This temperature indication is made available either as a direct visual reading on a meter, or as an output for a recorder which can provide a time-based temperature graph capable of being correlated with the conductivity graph produced by the conductivity recorder. With both temperature and conductivity signals available, it is possible to combine them to produce a scale of salinity or chloridicity.

To make the instrument usable through a wide range of conductivity values, and to permit accurate calibration, a switching circuit can be provided which can be made to switch various electrode combinations or a calibrating resistor into the circuit merely by varying the DC potential in a single control signal wire.

BRIEF DESCRIPTION OF THE DRAWINGS

FIG. 1 is an overall perspective view of the instrument of this invention;

FIG. 2 is a cutaway view of the probe used with the instrument of this invention;

FIG. 3 is a partial longitudinal cross section of the probe showing the relationship of the electrodes and the liquid;

FIG. 4 is a circuit diagram, partly in block form, of relevant portions of the device;

FIG. 5 is an equivalent circuit diagram of a portion of one embodiment of the invention; and FIG. 6 is a partial circuit diagram, partly in block form, of a second embodiment of the invention.

DESCRIPTION OF THE PREFERRED EMBODIMENTS

Referring first to FIG. 1, the instrument of this invention is generally depicted therein at 10. The instrument 10 consists of a meter unit 12 and a probe 14 connected to the meter unit 12 by a suitable length of cable 16.

The meter unit 12 includes a linear scale DC ammeter 18, a meter function switch 20, a temperature range switch 22, a conductivity range switch 24, concentric zero temperature and calibration controls 26 and concentric conductivity zero and conductivity offset controls 28. A temperature recorder output 30 and a conductivity recorder output 32 are also provided. The concentric zero control sets 26 and 28 are used to adjust the meter 18 for temperature and conductivity zero readings and to adjust the full scale meter or recorder calibration. The offset control brings the meter into a convenient range when operating in the expanded scale mode. The cable 16 can be plugged into the meter unit 12 by means of an appropriate six-prong plug 34 or affixed permanently on a cable housing.

The probe 14 is shown in more detail in FIG. 2. It will be noted that the probe 14 consists of a body 36 which is preferably fabricated from a sturdy corrosion-resistant and nonconductive plastic material. The forward end (in FIG. 2) of the probe 14 receives the cable 16 through a liquidproof fitting 38. The same forward end of the probe 14 has a relatively narrow passage 40 formed therein to provide accelerated liquid flow and create sufficient turbulence, when liquid flows through the probe, to prevent stagnation of the liquid in the measuring portion of the probe. In the probe, a circuit board 46 is mounted carrying the electronic circuitry and supporting the electrodes. The circuit board 46 is mounted in corrosion-resistant plastic. The circuit board 46 is also provided with a pair of thermistor beads 48, 50 which provide a linear measurement of the temperature of the liquid flowing between the electrodes on circuit board 46 as will be hereinafter explained.

As is shown in more detail in FIG. 3, the circuit board 46 has mounted thereon two pairs of electrodes 52 and 54. One each of pair of electrodes 52 and 54 is also visible in FIG. 2. The electrodes 52 and 54 are covered by a thin film 58 of a biologically sterile and corrosionproof dielectric material which can be tantalum oxide or other high-dielectric material which acts as the dielectric portion of a lossy capacitor whose lossy element is the resistance path of the liquid to be measured. Thus, one portion of the capacitor is the tantalum oxide and another portion is the liquid being measured.

It will be understood by those skilled in the art that the electrodes 52, 54 may be formed as dielectric-coated metal elements or as metal-clad dielectric elements, or may be constructed by any other well-known method of capacitor construction. The use of tantalum oxide provides a dielectric of high dielectric constant, hence of low series reactance in the measuring circuit even at low frequencies.

The interrelationship of the significant components of the meter unit 12 are illustrated in block diagram form in FIG. 4. The meter unit 12 contains a regulated DC power supply 60 which preferably uses flashlight batteries 62 as the power source. The power supply 60 delivers a zener-regulated voltage of plus and minus 9v. DC to terminals D and E of plug 34. The ground potential to which these voltages are related appears at terminal B of plug 34.

An amplitude-stabilized oscillator 63 delivers a constant voltage $E_o$ to a series circuit consisting, during measurements, of substantially either the electrodes 52 or the electrodes 54 in series with a sampling resistor 64. The equivalent circuit of this is shown in FIG. 5. When the series reactance of $C_s$ (the combination of an electrode 52 or 54 and its dielectric coating 58) is low and $R_s$ (the resistance of resistor 64) is low compared to $R_x$ (the effective resistance of the liquid), then the total impedance of the circuit becomes substantially $R_x$, and the current I can be expressed by the formula $$I = E_o/R_x = E_o G_x$$

in which $G_x$ is the conductance of the liquid being measured. The voltage $E_x$ developed across the sampling resistor 64 equals $IR_s$, and consequently its value can be expressed by the formula $E_x = (E_o R_s) G_x$ With $E_o$ and $R_s$ constant, $E_x$ is directly proportional to the conductivity of the water path, the quantity to be metered. Corrosion or electroplating of the electrodes, which might affect the value of I, is prevented by the dielectric 58.

The small voltage $E_x$ developed across the sampling resistor 64 is amplified by a first AC gain-stabilized amplifier 66 before being sent up form the probe 14 to provide a sufficiently high signal level so that the output signal will not be significantly affected by the parameters of the cable 16. A second AC amplifier 68 drives the detector 70 and functions as a range control in conjunction with the range switch 24.

The range switch 24 also operates a switch 72 in the probe to select the proper set of electrodes for a given range, or to substitute the calibrating resistor 74 for the electrodes 52, 54 when it is desired to calibrate the meter.

To accomplish this, the conductivity range switch 24 is tied in such a manner to the control voltage circuitry 60 that several different control voltage outputs will appear at terminal A of plug 34 depending upon the position of the conductivity range switch 24. Specifically, terminal A is grounded when the conductivity range switch 24 is in the "calibrate" position; a low voltage control signal will appear at Terminal A when the conductivity range switch is in the four high conductivity ranges; and a high voltage control signal will appear at terminal A when the conductivity range switch is in the four low conductivity positions. These control voltages actuate relays in the probe which switch in, respectively, the desired electrodes or the precision resistor 74 for calibration.

The output of detector 70 is a DC voltage directly proportional to the unknown liquid's conductivity. A DC stabilized amplifier 76 drives the meter 18 and/or a recorder (not shown) plugged into the recorder jack 32. The amplifier 76 may be used in a differential mode with an adjustable current offset in the expanded-scale setting of meter function switch 20, by use of the variable resistor 78.

Temperature measurement is accomplished by dual aged thermistor beads 48, 50 (FIG. 2) which provide a resistance change which is a linear function of temperature. This resistance change is sensed by a DC differential amplifier 80, whose output may be used to drive the meter 18 and/or a recorder (not shown) plugged into the recorder jack 30.

Specifically, because of its simplicity, an AC capacitively coupled ohmmeter circuit has been described in connection with FIG. 4. An AC bridge circuit as shown in FIG. 6 is also possible, with a fixed capacitor 82 correcting for the capacitance in the water path, and a servosystem 84 being used to null the bridge by varying an electrically adjustable resistor 86 whose value is made equal to the unknown water resistance or conductance being measured. Suitably chosen diode 88 will provide a small signal conductance which is linearly related to the DC current passing through it. Consequently it can be DC driven by amplifier 90 and the detector to adjust the resistor 86 for an AC null, with the DC current required for nulling being a direct indication of conductance of the water path. In that way, the conductivity signal brought up through cable 16 can be a DC current signal which, e.g., for deep well applications, is not subject to the effect of the impedance of cable 16. Other methods of resistance variation are possible, as would be apparent to those skilled in the art.

The servoing of the AC bridge may be accomplished by electromechanical, photoelectric, or other means, and the servo output converted to a metering signal by like or other known methods.

It will be noted that the meter function switch 20 is shown in FIG. 1 to have additional positions for battery testing and scale expansion, but these positions are not shown in FIG. 4 as they involve conventional techniques and are not material to the invention herein described.

It will be seen that the present invention provides an effective, accurate and linear direct-reading conductivity measuring device which is suitable for continuous data recording, is not subject to corrosion, and is suitable for use in very small spaces. Obviously, the embodiment described herein is merely illustrative and may be modified as desired to suit the requirements of specific uses.

We claim:

1. In apparatus for measuring the conductivity of a liquid comprising a linear DC ammeter, an oscillator circuit, a pair of dielectric-faced, liquid-proofed electrodes, an AC amplifier circuit including a resistance means, a detector circuit, means coupling the output of said oscillator circuit to the input of said amplifier circuit through said pair of electrodes, means coupling the output of said amplifier to the input of said detector circuit and means coupling the output of said detector circuit to said linear DC ammeter; the improvement enabling the conductivity of said liquid to be continuously monitored at a given point in situ in a body of said liquid comprising an annular probe body of corrosion resistant, nonconductive material with said dielectric-faced, liquid-proofed electrodes spaced from each other on the inner periphery thereof, said AC amplifier circuit including a resistance means being sealed within the wall of said annular probe body, said detector circuit and linear DC ammeter being separate from said probe body, said means coupling the output of said amplifier to said detector circuit comprising an elongated cable extending between said probe body and said detector circuit, and said oscillator circuit providing alternating current of a frequency at which the capacitance between said electrodes is small compared to the resistance of the liquid of said body of said liquid between said electrodes.

2. Apparatus as claimed in claim 1 wherein said oscillator circuit together with said means coupling the output of said oscillator circuit to the input of said amplifier through said pair of electrodes are included within the wall of said annular probe body.

3. Apparatus as claimed in claim 1 wherein a thermistor is sealed within the wall of said annular probe body and said elongated cable includes means for connecting said thermistor to said linear DC ammeter.

4. Apparatus as claimed in claim 1 wherein a fixed resistance means together with electrically activated switch relay means for alternatively substituting said fixed resistance means for said pair of electrodes to enable calibration of said apparatus are sealed within the wall of said annular probe body and said cable includes means for connecting said switch relay means to said DC power supply.